US011349383B2

(12) United States Patent
Jiang et al.

(10) Patent No.: US 11,349,383 B2
(45) Date of Patent: May 31, 2022

(54) FAULT PROTECTION METHOD USED IN MULTIPHASE SWITCHING CONVERTERS WITH DAISY CHAIN CONFIGURATION

(71) Applicant: Chengdu Monolithic Power Systems Co., Ltd., Chengdu (CN)

(72) Inventors: Lijie Jiang, Hangzhou (CN); Yongheng Sun, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 151 days.

(21) Appl. No.: 16/934,400

(22) Filed: Jul. 21, 2020

(65) Prior Publication Data

US 2021/0028686 A1 Jan. 28, 2021

(30) Foreign Application Priority Data

Jul. 26, 2019 (CN) .......................... 201910686386.9

(51) Int. Cl.
*H02M 1/32* (2007.01)
*H02M 3/158* (2006.01)

(52) U.S. Cl.
CPC ........... *H02M 1/32* (2013.01); *H02M 3/1584* (2013.01); *H02M 3/1586* (2021.05)

(58) Field of Classification Search
CPC ..... H02M 1/32; H02M 3/1584; H02M 3/1586
See application file for complete search history.

(56) References Cited

U.S. PATENT DOCUMENTS

| 8,493,044 B2 | 7/2013 | Xu et al. | |
| 8,710,810 B1* | 4/2014 | McJimsey | H02M 3/158 |
| | | | 323/283 |
| 9,912,240 B1 | 3/2018 | Nguyen et al. | |
| 10,270,343 B2 | 4/2019 | Nguyen et al. | |
| 2007/0040657 A1* | 2/2007 | Fosler | H03M 1/363 |
| | | | 340/333 |

\* cited by examiner

*Primary Examiner* — Rafael O De Leon Domenech
(74) *Attorney, Agent, or Firm* — Perkins Coie LLP

(57) ABSTRACT

A fault protection method used in a multiphase switching converter which includes a plurality of switching circuits coupled in parallel and a plurality of control circuits configured in a daisy chain. Each control circuit has a first terminal coupled to a phase control signal, a second terminal coupled to a previous control circuit in the daisy chain to receive a phase input signal, and a third terminal coupled to a latter control circuit in the daisy chain to provide a phase output signal. The fault protection method includes: configuring a first control circuit as a master control circuit to provide the phase control signal; respectively configuring the rest of the control circuits as a slave control circuit to receive the phase control signal; if a fault condition is detected in the first control circuit, changing the first control circuit into a slave control circuit and generating a second pulse on the phase output signal of the first control circuit; and if a second pulse is detected on a phase input signal of a second control circuit, changing the second control circuit into a master control circuit.

25 Claims, 10 Drawing Sheets

FAULT PROTECTION METHOD USED IN MULTIPHASE SWITCHING CONVERTERS WITH DAISY CHAIN CONFIGURATION

CROSS-REFERENCE TO RELATED APPLICATIONS

This application claims the benefit of CN application 201910686386.9, filed on Jul. 26, 2019, and incorporated herein by reference.

TECHNICAL FIELD

The present invention generally relates to electronic circuits, and more particularly but not exclusively, to multiphase switching converters.

BACKGROUND

In recent years, along with the rapid development of central processing units (CPUs), multiphase switching converters with outstanding performance in thermal, EMI and load transient response are widely used in power solutions for the CPUs.

The number of phases in the multiphase switching converter is determined by the load, and needs to be increased when current required by the load increases. For multiphase switching converters with single controller, this means logic, circuit, structure and size of the controller all need to be adjusted, which undoubtedly increases the burden of system development and overall cost.

Therefore, daisy chain architecture with good scalability is introduced into the multiphase switch converter, wherein a plurality of control circuits are utilized and each of the control circuit is used for driving one phase. In this configuration, the total phase number of the multiphase phase switching converter can be easily adjusted according to practical applications. If the phase number needs to be increased, users only need to add new control circuits and corresponding components into the daisy chain, with very simple adjustment of electrical connections.

However, how to realize fault protection in multiphase switching converters, so the converter could still work even when one or more phases have failed, becomes a new challenge.

SUMMARY

Embodiments of the present invention are directed to a fault protection method used in a multiphase switching converter, wherein the multiphase switching converter includes a plurality of switching circuits coupled in parallel, and a plurality of control circuits configured in a daisy chain and respectively coupled to a corresponding one of the plurality of switching circuits. Each of the control circuits has a first terminal, a second terminal and a third terminal, wherein the first terminals of the plurality of control circuits are coupled together to share a phase control signal, the second terminal of each control circuit is coupled to a previous control circuit in the daisy chain to receive a phase input signal, and the third terminal of each control circuit is coupled to a latter control circuit in the daisy chain to provide a phase output signal, wherein the phase output signal has a first pulse in normal operation. The fault protection method comprises: configuring a first control circuit as a master control circuit to provide the phase control signal; and respectively configuring each of the rest of the plurality of control circuits as a slave control circuit to receive the phase control signal. If a fault condition is detected in the first control circuit, changing the first control circuit into a slave control circuit and generating a second pulse on the phase output signal of the first control circuit. If a second pulse is detected on a phase input signal of a second control circuit, changing the second control circuit into a master control circuit.

Embodiments of the present invention are also directed to a fault protection method used in a control circuit of a multiphase switching converter. The fault protection method comprises: determining whether the control circuit is configured as a master control circuit or a slave control circuit; providing the phase control signal at the first terminal of the control circuit if the control circuit is configured as a master control circuit, and receiving the phase control signal at the first terminal of the control circuit if the control circuit is configured as a slave control circuit; determining whether there exists a fault condition in the control circuit; and if the control circuit is configured as a master control circuit and a fault condition is detected in the control circuit, changing the control circuit into a slave control circuit and generating a second pulse on the phase output signal of the control circuit.

Embodiments of the present invention are further directed to a control circuit used in a multiphase switching converter. The control circuit comprises: a first terminal configured to share a phase control signal with the rest of the plurality of control circuits; a second terminal configured to receive a phase input signal from a previous control circuit in the daisy chain; and a third terminal configured to provide a phase output signal to a latter control circuit in the daisy chain, wherein the phase output signal has a first pulse in normal operation. The control circuit is configured to provide the phase control signal when it is configured as a master control circuit, and is configured to receive the phase control signal when it is configured as a slave control circuit; and wherein if the control circuit is configured as a master control circuit and a fault condition is detected in the control circuit, the control circuit will change into a slave control circuit and generate a second pulse on the phase output signal of the control circuit.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Figure 1A:
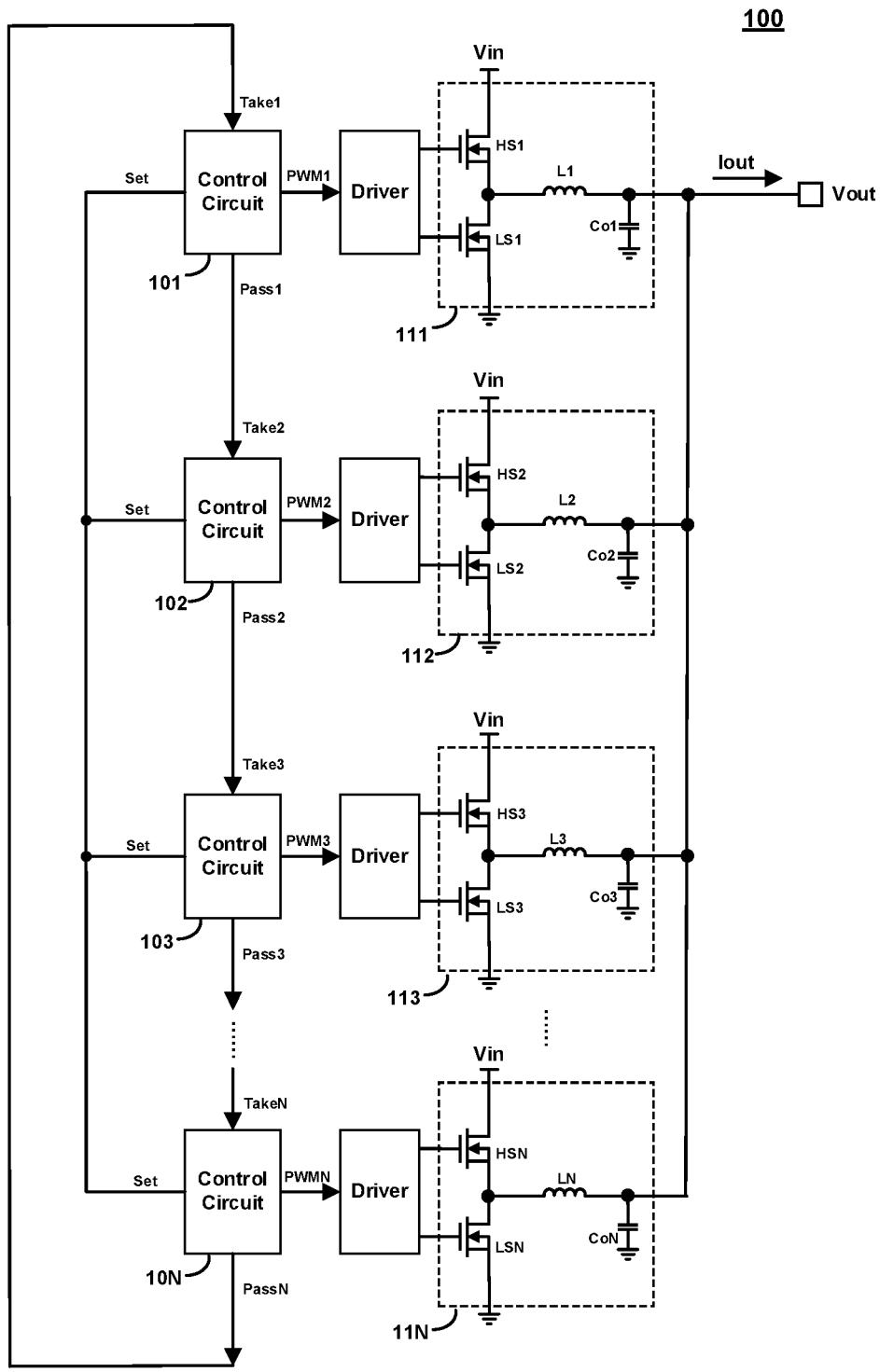
FIG. 1A is a schematic block diagram of a multiphase switching converter 100 in accordance with an embodiment of the present invention.

FIG. 1 is a schematic block diagram of a multiphase switching converter 100 in accordance with an embodiment of the present invention. It includes a plurality of switching circuits 111~11N coupled in parallel, and a plurality of control circuits 101~10N configured in a daisy chain, wherein N is an integer greater than 1. Each of the switching circuits has an input terminal coupled to an input voltage Vin and an output terminal coupled to a load to provide an output voltage Vout. The control circuits 101~10N are respectively coupled to a corresponding one of the switching circuits 111~11N. Each control circuit 10$i$ ($i$=1, 2, . . . , N) has a first terminal, a second terminal and a third terminal, wherein the first terminal is coupled with the first terminals of the rest of control circuits to share a phase control signal Set, the second terminal of the control circuit 10$i$ is coupled to the third terminal of a previous control circuit in the daisy chain to receive a phase input signal Take$i$, and the third terminal of the control circuit 10$i$ is coupled to the second terminal of a latter control circuit in the daisy chain to provide a phase output signal Pass$i$.

During normal operation, the control circuit 10$i$ generates a first pulse on the phase output signal Pass$i$, and a switch control signal PWM$i$ for controlling the corresponding switching circuit 11$i$, based on the phase input signal Take$i$ and the phase control signal Set. In some embodiments, the switching circuit 11$i$ is configured in synchronous BUCK (also called "step-down circuit"), which includes a high side transistor HS$i$, a low side transistor LS$i$, an inductor L$i$ and an output capacitor Co$i$. When the switch control signal PWM$i$ is logical high, the high side transistor HS$i$ is on and the low side transistor LS$i$ is off. When the switch control signal PWM$i$ is logical low, the high side transistor HS$i$ is off and the low side transistor LS$i$ is on. Of course, there might be dead time intentionally involved to avoid shoot through of the high side and low side transistors.

The phase control signal Set normally includes a plurality of pulses, such as PULSE 1~PULSE N, for successively triggering the plurality of switching circuits to provide power to the load. Generally speaking, the switch control signals PWM1~PWMN are respectively synchronized with one of the plurality of pulses PULSE 1~PULSE N. For example, the rising edge of the switch control signal PWM$i$ is synchronized with the rising edge of PULSE $i$, so that the high side transistor HS$i$ is turned on and the low side transistor LS$i$ is turned off at the rising edge of PULSE $i$, and the corresponding switching circuit 11$i$ is triggered to provide power to the load.

Figure 1B:
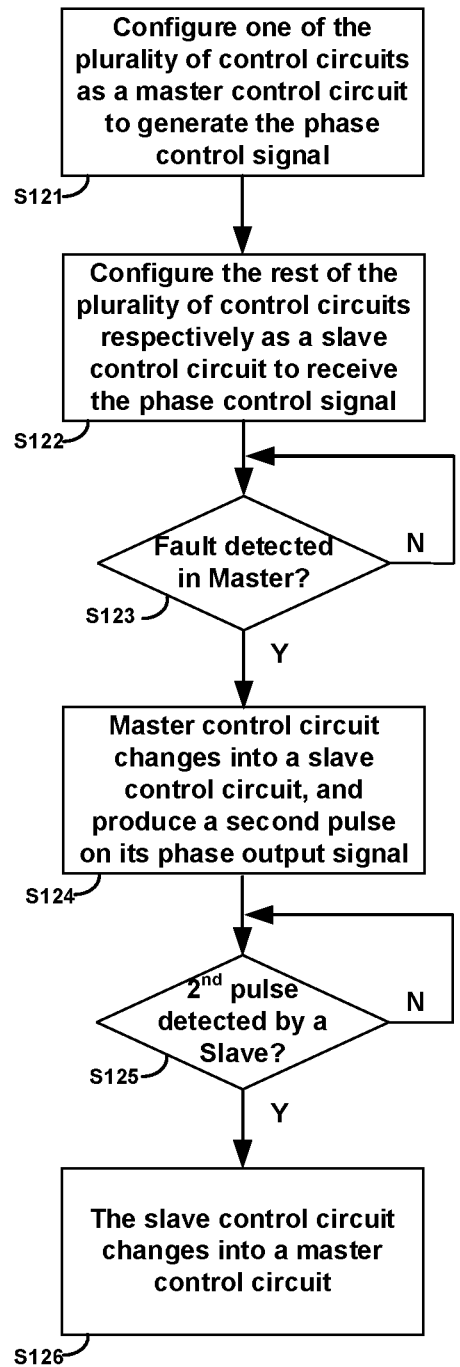
FIG. 1B is a flowchart of a fault protection method used in the multiphase switching converter 100 in accordance with an embodiment of the present invention.

FIG. 1B is a flowchart of a fault protection method used in the multiphase switching converter 100 in accordance with an embodiment of the present invention. It includes steps S121~S126.

In step S121, one of the plurality of control circuits 101~10N, e.g., the control circuit 101, is configured as a master control circuit to provide the phase control signal Set at its first terminal.

In step S122, the rest of the plurality of control circuits, e.g., the control circuits 102~10N, are respectively as a slave control circuit to receive the phase control signal Set.

In step S123, whether there exists a fault condition in the control circuit 101 is determined. If yes, the process will go to step S124.

In step S124, the control circuit 101 is changed into a slave control circuit. It stops providing the phase control signal Set at its first terminal, and produces a second pulse on its phase output signal Pass1. In some embodiments, the control circuit 101 will change its phase output signal Pass1 to be equal to its phase input signal Take1 after the second pulse is ended, so as to bypass itself. In some further embodiments, the control circuit 101 could resume to normal operation as a slave control circuit, if the fault condition disappears later on.

In step S125, whether a second pulse is detected on a phase input signal (e.g. Take2) of a slave control circuit (e.g. the control circuit 102) is determined. If yes, the process will go to step S126.

In step S126, the control circuit 102, which has detected a second pulse at its phase input signal Take2, is changed into a mater control circuit to provide the phase control signal Set at its first terminal.

Through the aforementioned procedure, the multiphase switching converter 100 could work normally even if the master control circuit fails. Embodiments of the present invention will be further illustrated in conjunction with working waveforms. People of ordinary skills in the art could realize, however, that these waveforms are only used for exemplary purpose, rather than for limiting the present invention.

Figure 2A:
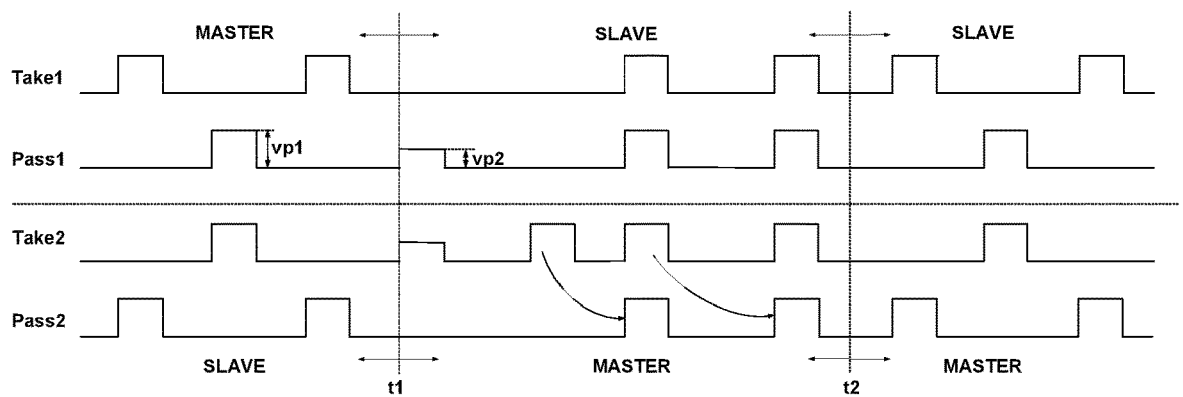
FIG. 2A~2C show working waveforms of a dual phase switching converter in a fault protection mode in accordance with embodiments of the present invention.

Taking a dual-phase switching converter (N=2) as an example, as shown in FIG. 2A, before t1, the control circuit 101 is a master control circuit, and the control circuit 102 is a slave control circuit. The dual-phase switching converter works normally, and the phase output signal Pass1 has a first pulse with a pulse amplitude of vp1.

At t1, the control circuit 101 detects a fault condition, and then changes into a slave control circuit and generates a second pulse with a pulse amplitude of vp2 on its phase output signal Pass1. In some embodiments, vp1 is about 3.3V and vp2 is about 1.5V. The control circuit 102 detects a second pulse on its phase input signal Take2 based on the pulse amplitude, and then changes into a master control circuit to provide the phase control signal Set at its first terminal.

In some embodiments, a voltage level between a threshold voltage Vth1 (e.g. 2V) and a power supply voltage Vcc (e.g. 3.3V) is considered as a logical high level ("1"), a voltage level between zero voltage (0 V) and a threshold voltage Vth2 (e.g. 1V) is considered as a logical low level ("0"), and a voltage level between the threshold voltage Vth2 and Vth1 is considered as an intermediate level. The first pulse is switched between a low level and a high level, and the second pulse is switched between a low level and an intermediate level. The control circuit will determine that a second pulse has been detected, if an intermediate level is discovered on its phase input signal.

After the second pulse ends, the control circuit 101 changes its phase output signal Pass1 to be equal to the phase input signal Take1, until it exits the fault condition at t2. After t2, the dual-phase switching converter resumes to normal operation. However, at this time, the control circuit 101 is a slave control circuit, and the control circuit 102 is a master control circuit.

Figure 2B:
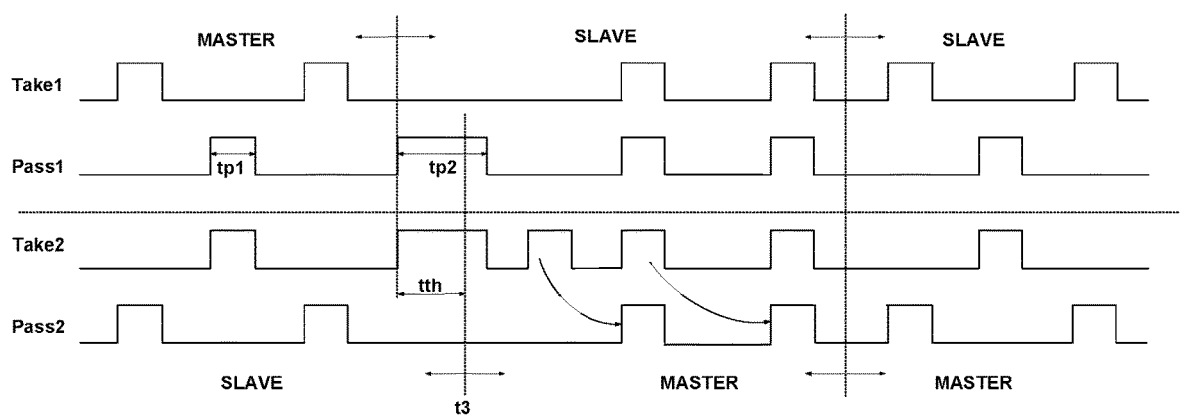

FIG. 2B is a schematic working waveform of a dual-phase switching converter in a fault protection mode according to another embodiment of the present invention, wherein the second pulse has the same pulse amplitude as the first pulse, but the pulse widths of them are different. The pulse width of the first pulse is tp1 (e.g., 60 ns), and the pulse width of the second pulse is tp2 (e.g., 350 ns). The control circuit 102 could monitor the pulse width of the pulse on the phase input signal Take2. When a pulse width greater than a threshold tth (tp1<tth<tp2, e.g. tth=200 ns) is discovered, the control circuit 102 determines a second pulse has been detected, and then changes into a master control circuit.

Figure 2C:
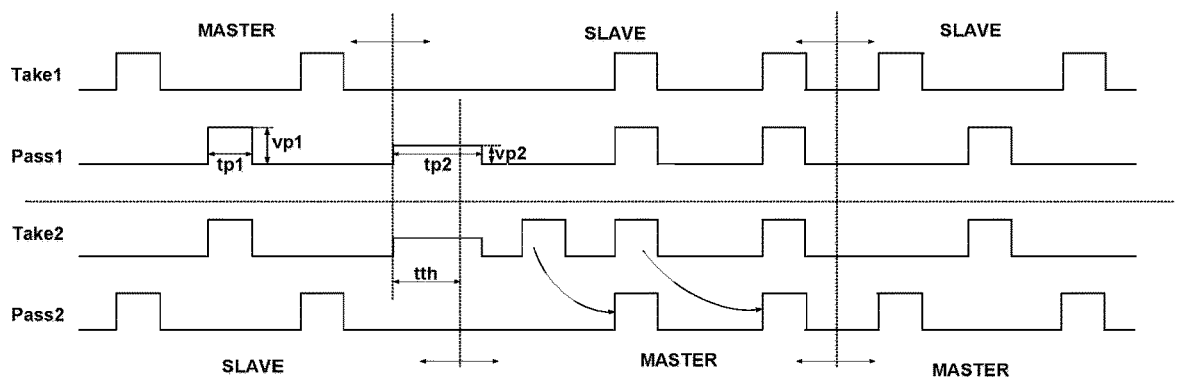

FIG. 2C is a schematic working waveform of a dual-phase switching converter in a fault protection mode according to yet another embodiment of the present invention, wherein the pulse amplitude and pulse width of the second pulse are both different from that of the first pulse. The control circuit 102 determines that a second pulse has been detected when the phase input signal Take2 is maintained at the pulse amplitude vp2 for a time period longer than the threshold tth.

In the embodiments of FIG. 2A~2C, the second pulse has a pulse width, or a pulse amplitude, or both, different from that of the first pulse. However, this is not intended to limit the present invention. Those of ordinary skill in the art may understand that, in other embodiments, the second pulse may also have a different pulse frequency, offset level, or other electrical parameters than the first pulse, as long as the control circuit could distinguish the second pulse from the first pulse generated in normal operation.

The foregoing fault condition may include one or more of over voltage, over current, over temperature, under voltage, and transistor failure of the control circuit or its corresponding switching circuit. In order to prevent false triggering, in some cases, only after the aforementioned fault condition occurs for several times or lasts for a period of time, could the fault be determined as being detected and the corresponding fault protection be conducted. In addition, the master control circuit does not necessarily switch to a slave control circuit and generate a second pulse immediately after a fault condition is detected. The master-to-slave switching and second pulse generation could be performed after other protection actions are completed or after a certain delay. Similarly, the slave control circuit does not necessarily switch to a master control circuit immediately after detecting a second pulse at its phase input signal, nor necessarily start to generate the phase control signal immediately after becoming a master control circuit. There may be delay between these actions.

In some embodiments, when the control circuit is set as a mater control circuit, in addition to generating the phase control signal Set, it can also communicate with a host controller through a communication bus to receive commands from the host controller, and feedback working states of the multiphase switching converter to the host controller. Moreover, the master control circuit can further be responsible for managing the start-up, shutdown and protection of the entire multiphase switching converter, and monitoring whether there exists a fault condition in all the slave control circuits.

In some embodiments, if the control circuit 102 is also in a fault condition when it detects a second pulse on the phase input signal Take2, it will remain as a slave control circuit, instead of changing into a master control circuit. At this time, the second pulse on the phase input signal Take2 is transferred to the phase output signal Pass2. If the control circuit 103 detects a second pulse on its phase input signal Take3 and the control circuit itself is not in a fault condition, the control circuit 103 will change into a master control circuit and provide the phase control signal Set at its first terminal.

Figure 3:
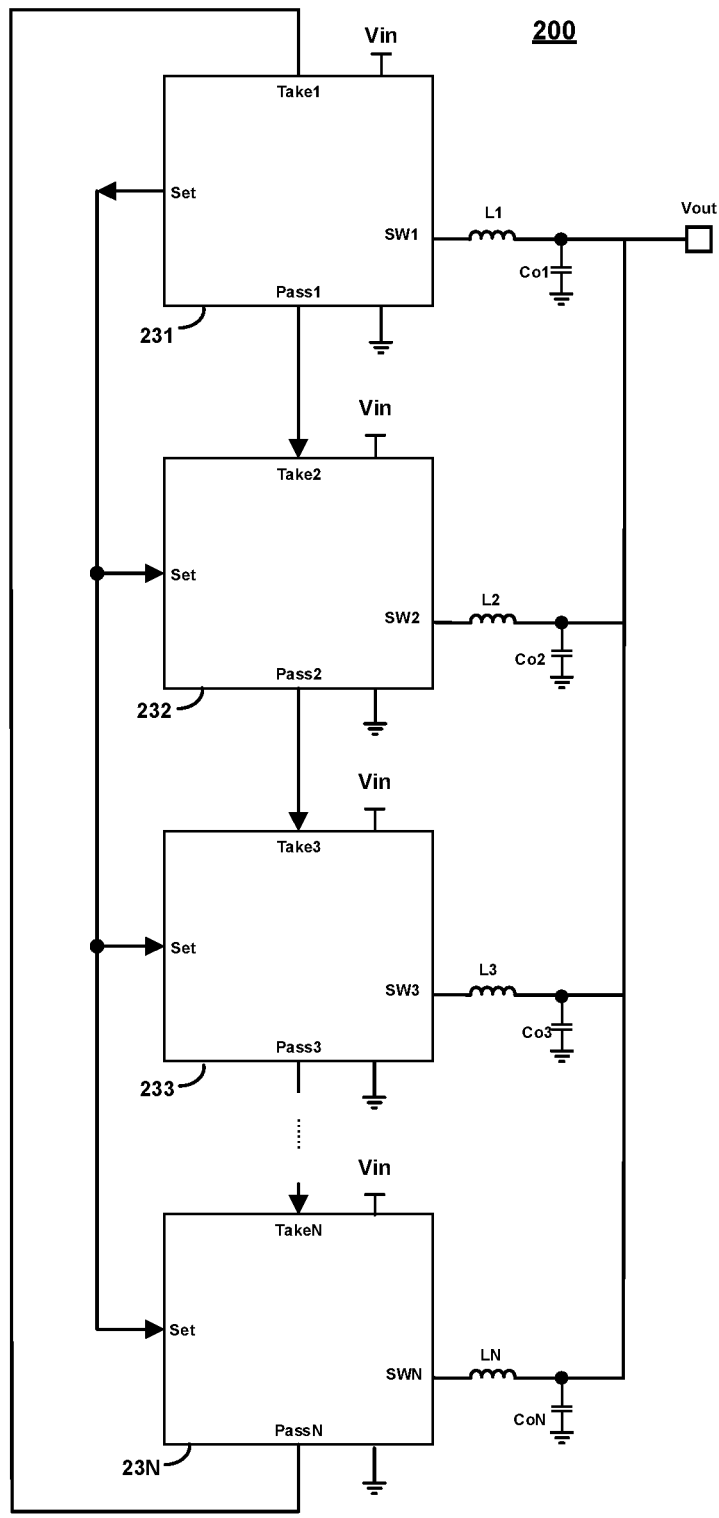
FIG. 3 is a schematic block diagram of a multiphase switching converter 200 in accordance with an embodiment of the present invention.

FIG. 3 is a schematic block diagram of a multiphase switching converter 200 in accordance with an embodiment of the present invention. It includes control ICs 231~23N with same internal structure. Compared with the example shown in FIG. 1A, each control IC in FIG. 3 integrates a control circuit, a driving circuit, and transistors in a corresponding switching circuit.

Figure 4:
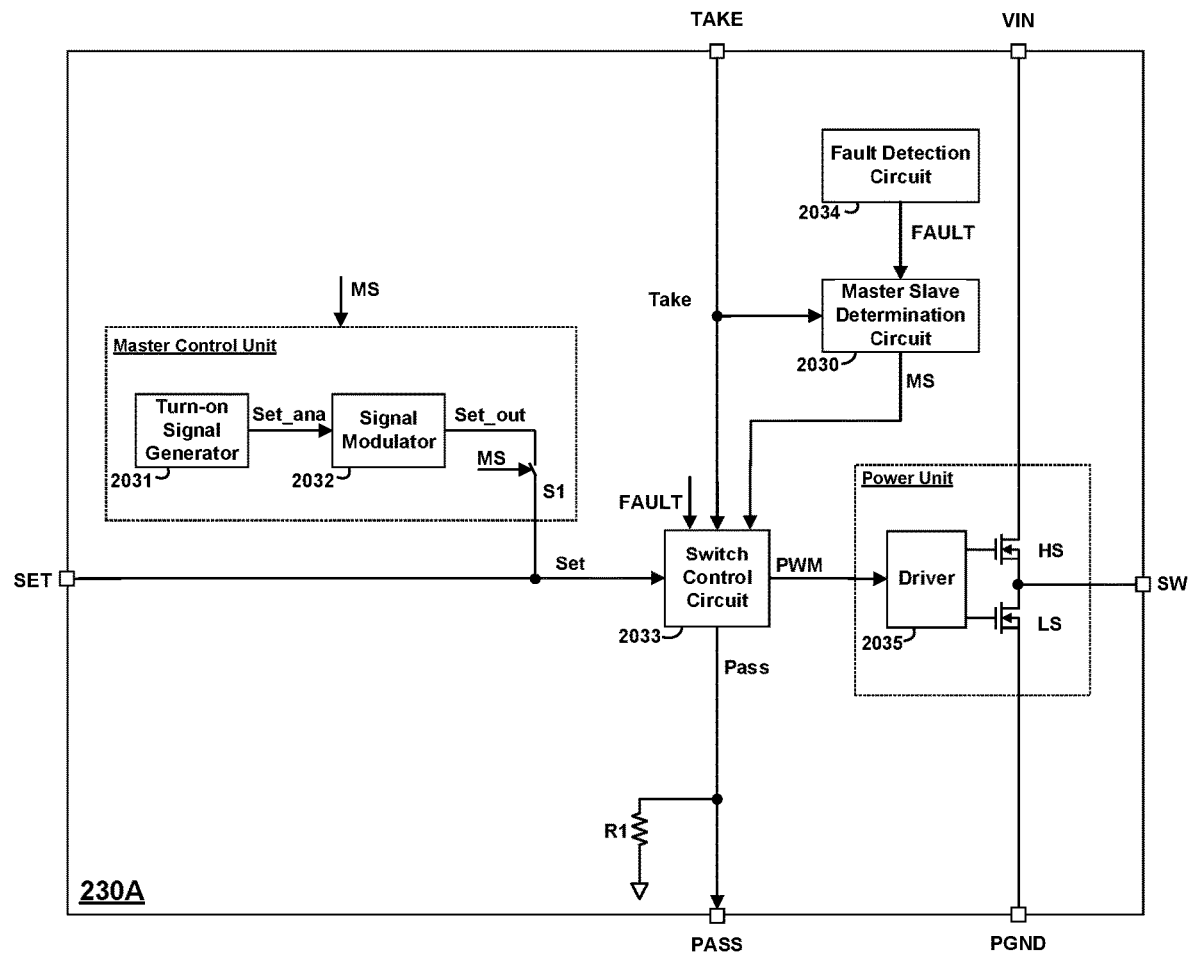
FIG. 4 is a schematic block diagram of a control IC 230A used in the multiphase switching converter 200 in accordance with an embodiment of the present invention.

FIG. 4 is a schematic block diagram of a control IC 230A used in the multiphase switching converter 200 in accordance with an embodiment of the present invention. The control IC 230A includes a master control unit, a power unit, a master slave determination circuit 2030, a switch control circuit 2033, a fault detection circuit 2034, and a plurality of pins. Pin SET is configured to share a phase control signal Set, pin TAKE is configured to receive a phase input signal Take, pin PASS is configured to provide a phase output signal Pass, pin VIN is configured to receive an input voltage Vin, pin PGND is configured to be couple to a power ground, and pin SW is configured to be coupled to a load, e.g., through one or more external components. The power unit includes transistors HS and LS as well as a driver circuit 2035. The transistors HS and LS are coupled in series between pins VIN and PGND, and the connection node of transistors HS and LS is connected to pin SW.

The master control unit is used to generate the phase control signal Set. The fault detection circuit 2034 is configured to determine whether a fault condition has occurred in the control IC 230A, and generate a fault detection signal FAULT. The master slave determination circuit 2030 is coupled to the pin TAKE and the fault detection circuit 2034. Based on the phase input signal Take and the fault detection signal FAULT, the master slave determination circuit 2030 determines whether the control IC 230A should be set as a master control IC or a slave control IC, and generates a master slave determination signal MS for controlling the master control unit. The switch control circuit 2033 is coupled to the pins SET and TAKE, the fault detection circuit 2034 and the master slave determination circuit 2030, and is configured to generate a switch control signal PWM and the phase output signal Pass based on the phase control signal Set, phase input signal Take, fault detection signal FAULT and master slave determination signal MS.

In one embodiment, the master control unit includes a turn-on signal generator 2031, a signal modulator 2032 and a switch 51. The turn-on signal generator 2031 is configured to generate a turn-on control signal Set_ana. The signal modulator 2032 is coupled to the turn-on signal generator 2031, and configured to generate a preprocess signal Set_out based on the turn-on control signal Set_ana. The switch 51 has a first terminal, a second terminal and a control terminal, wherein the first terminal is coupled to the signal modulator 2032 to receive the preprocess signal Set_out, the second terminal is coupled to pin SET, and the control terminal is coupled to the master slave determination circuit 2030 to receive the master slave determination signal MS.

Figure 5:
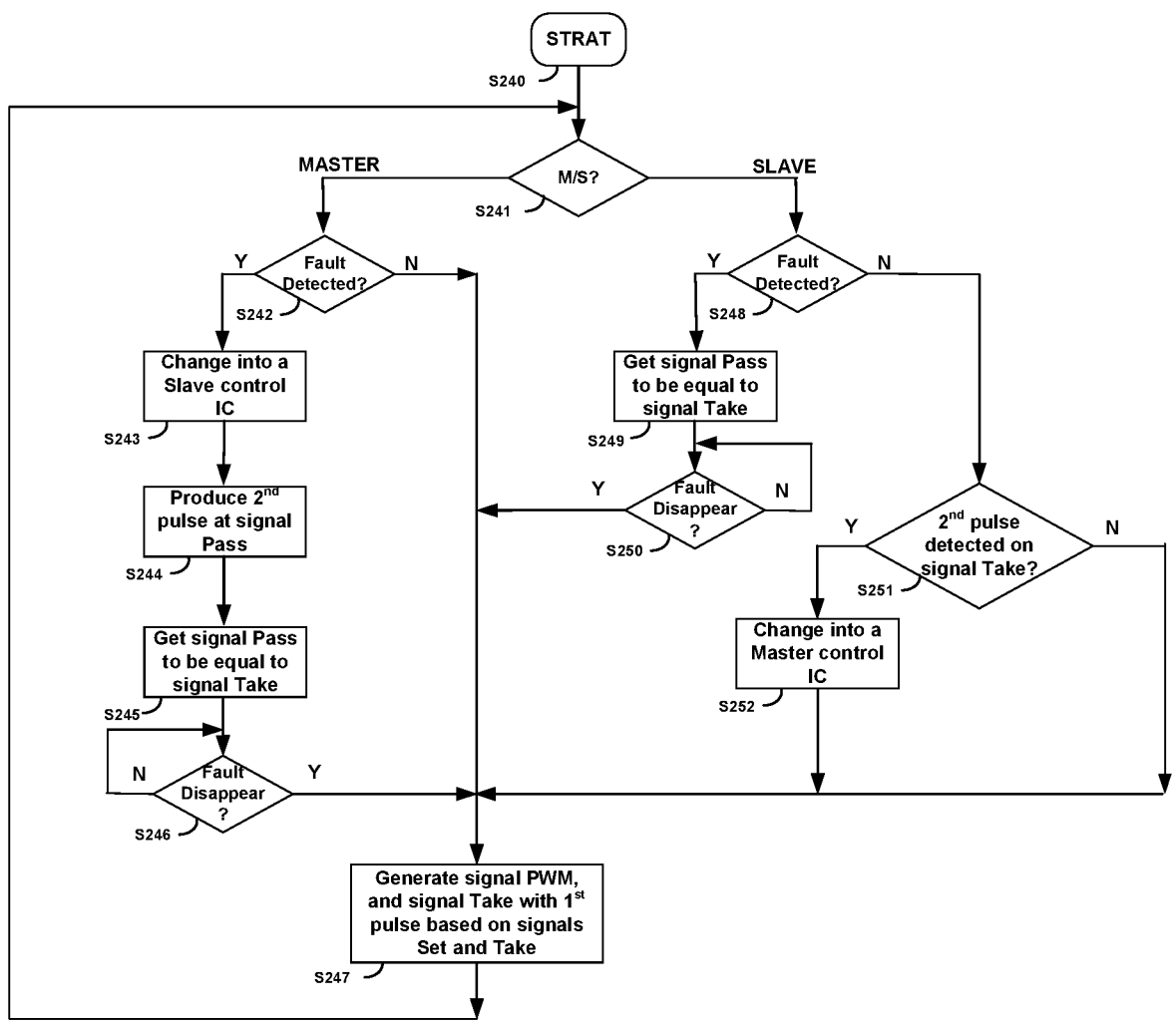
FIG. 5 is a flowchart of a fault protection method used in the control IC 230A in accordance with an embodiment of the present invention.

FIG. 5 is a flowchart of a fault protection method used in the control IC 230A in accordance with an embodiment of the present invention. It includes steps S240~S252.

In step S240, the control IC 230A is powered on, and starts to work.

In step S241, it is determined whether the control IC 230A is initially configured as a master control IC or a slave control IC. If the control IC 230A is initially configured as a master control IC, the process will proceed to step S242. As a master control IC, the master control unit of the control IC 230A will be responsible for providing the phase control signal Set to the pin SET. If the control IC 230A is initially set as a slave control IC, the process will proceed to step S248.

In one embodiment, the control IC 230A further includes a pull-down resistor R1 coupled between the pin PASS and a reference ground. In a daisy chain architecture, the control IC 230A can be initially configured as a master control IC by connecting the pin TAKE to a power supply voltage through an external pull-up resistor. Alternatively, without such an external pull-up resistor connected to pin TAKE, the control IC 230A is configured as a slave control IC. When the control IC 230A is just powered on, it will set the pin PASS to a high-impedance state for a period of time. And during this time period, the master slave determination circuit 2030 monitors the voltage at the pin TAKE to determine whether the control IC is configured as a master control IC or a slave control IC. If the voltage at the pin TAKE is high, the control IC is initially configured as a master control IC, else if the voltage at the pin TAKE is low, the control IC is initially configured as a slave control IC. In some other embodiments, the initial master-slave setting can also be achieved by adjusting the voltage, current, or resistance of other specific pins.

In step S242, it is determined whether the fault detection circuit 2034 has detected a fault condition, and if so, proceed to step S243, otherwise, proceed to step S247.

In step S243, the control IC 230A changes into a slave control IC, and its master control unit stops providing the phase control signal Set to the pin SET. In step S244, the control IC 230A generates a second pulse on the phase output signal Pass. In step S245, the phase output signal Pass is set to be equal to the phase input signal Take. A person skilled in the art could understand that there is not necessarily a chronological relationship between steps S243 and S244, thus they may be performed at the same time, or one may precede the other. It should also be noted that these two steps do not have to be performed immediately after a fault condition of the control IC is detected.

In step S246, it is determined whether the fault condition has disappeared. If yes, the process will proceed to step S247.

In step S247, the control IC 230A operates normally, and generates the switch control signal PWM, and the phase output signal Pass with the first pulse according to the phase control signal Set and the phase input signal Take.

In step S248, it is determined whether the fault detection circuit 2034 has detected a fault condition, and if so, the process will proceed to step S249. If not, the process will proceed to step S251.

In step S249, the phase output signal Pass is set to be equal to the phase input signal Take.

In step S250, it is determined whether the fault condition has disappeared. If yes, the process will proceed to step S247.

In step S251, it is determined whether a second pulse is detected on the phase input signal Take. If yes, proceed to step S252. Otherwise, proceed to step S247.

In step S252, the control IC 230A changes into a master control IC, and its master control unit provides a phase control signal Set to the pin SET. Afterwards, the process proceeds to step S247.

Figure 6:
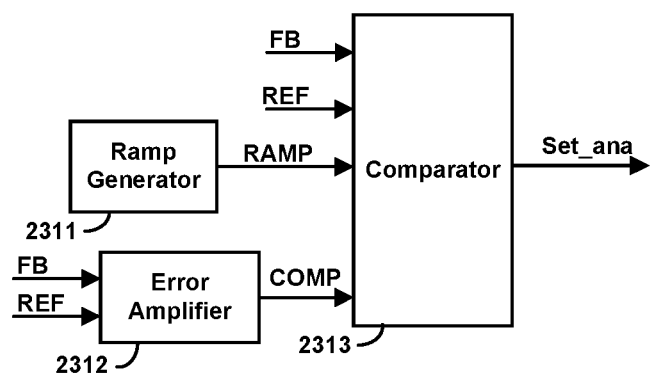
FIG. 6 is a schematic block diagram of a turn-on signal generator 2031A in accordance with an embodiment of the present invention.

FIG. 6 is a schematic block diagram of a turn-on signal generator 2031A in accordance with an embodiment of the present invention. The turn-on signal generator 2031A includes a ramp generator 2311, an error amplifier 2312 and a comparator 2313. The ramp generator 2311 is configured to provide a ramp signal RAMP. The error amplifier 2312 receives a reference signal REF and a feedback signal FB indicative of the output voltage Vout of the multiphase switching converter, and generates a compensation signal COMP based on these two signals. The comparator 2313 receives the feedback signal FB, the reference signal REF, the ramp signal RAMP and the compensation signal COMP, and generates the turn-on control signal Set_ana.

Figure 7:
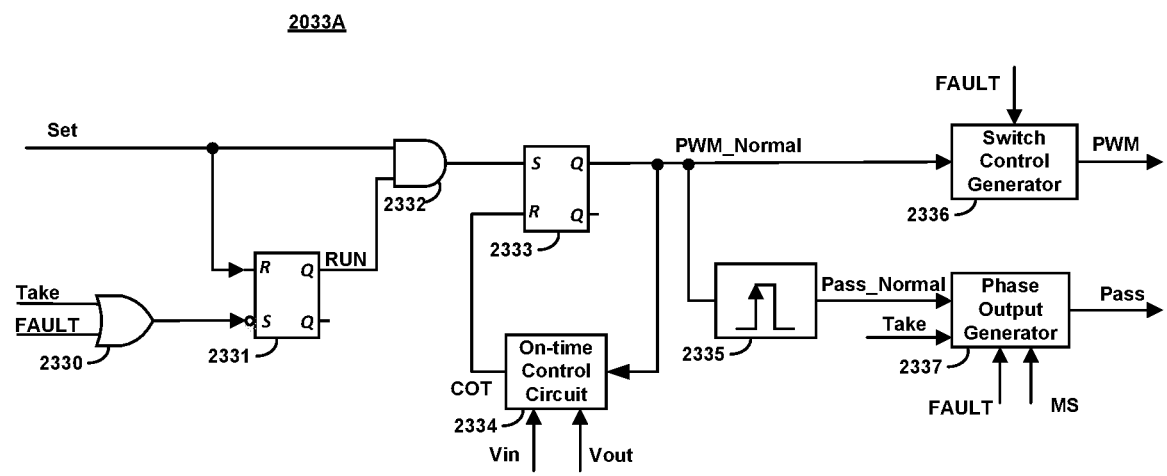
FIG. 7 is a schematic block diagram of a switch control circuit 2033A in accordance with an embodiment of the present invention.

FIG. 7 is a schematic block diagram of a switch control circuit 2033A in accordance with an embodiment of the present invention. The switch control circuit 2033A includes an OR gate 2330, RS flip-flops 2331, 2333, an AND gate 2332, an on-time control circuit 2334, a one-shot circuit 2335, a switch control generator 2336 and a phase output generator 2337. In this embodiment, a constant on-time control method is adopted. Under normal operation, at the falling edge of the phase input signal Take, the flip-flop 2331 is set and its output signal RUN is changed into logical high. After that, when the phase control signal Set changes from logical low into logical high, the flip-flop 2333 is set and its output signal PWM_Normal is changed into logical high. At the same time, the signal Pass_Normal also becomes high. The flip-flop 2333 will be reset by the on-time control circuit 2334 after a time period TON. This time period is usually determined by the input voltage Vin and output voltage Vout of the multiphase switching converter.

The switch control generator 2336 generates the switch control signal PWM based on the signal PWM_Normal and the fault detection signal FAULT. Under normal operation, the switch control signal PWM is equal to PWM_Normal. In some embodiment, if a fault condition is detected by the fault detection circuit 2034, the switch control signal PWM will be set to a high impedance state, so the power unit is disabled, and both the transistors HS and LS are off.

The phase output generator 2337 generates the phase output signal Pass based on the signal Pass_Normal, phase input signal Take, fault detection signal FAULT and master slave determination signal MS. Under normal operation, the phase output signal Pass is equal to Pass_Normal.

If a fault condition is detected by the fault detection circuit 2034 and the control IC 230A is set as a master control IC, the phase output generator 2337 will generate a second pulse at the phase output signal Pass, and then change the phase output signal Pass to be equal to the phase input signal Take.

If a fault condition is detected by the fault detection circuit 2034 and the control IC 230A is set as a slave control IC, the phase output generator 2337 will change the phase output signal Pass to be equal to the phase input signal Take.

Figure 8A:
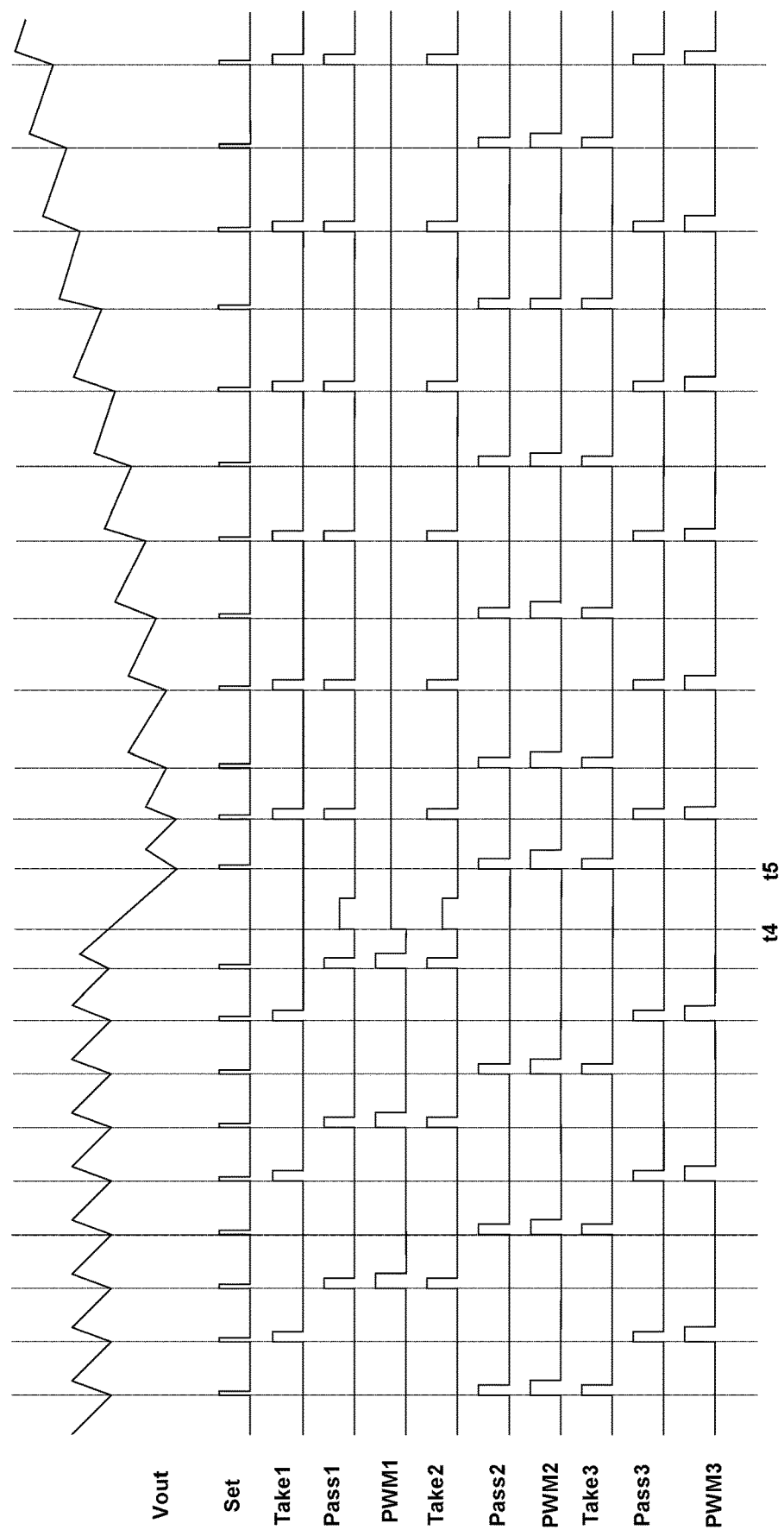
FIGS. 8A and 8B show working waveforms of a three-phase switching converter in a fault protection mode in accordance with embodiments of the present invention.

FIG. 8A shows working waveforms of a three-phase switching converter (N=3) in a fault protection mode in accordance with embodiments of the present invention. As shown in FIG. 8A, before t4, the control IC 231 is a master control IC, the remaining control ICs 232 and 233 are both slave control ICs, and the switching converter works normally.

At t4, the control IC 231 detects a fault condition, and therefore becomes a slave control IC. It stops providing the phase control signal Set, and generates a second pulse on its phase output signal Pass1. Compared with the first pulse in normal operation, the second pulse has a different pulse width and a different pulse amplitude. After the second pulse ends, the control IC 231 changes its phase output signal Pass1 to be equal to the phase input signal Take1.

The control IC 232 detects the second pulse on its phase input signal Take2, and does not detect a fault condition in itself, so it becomes a master control IC and provides the phase control signal Set from t5.

Figure 8B:
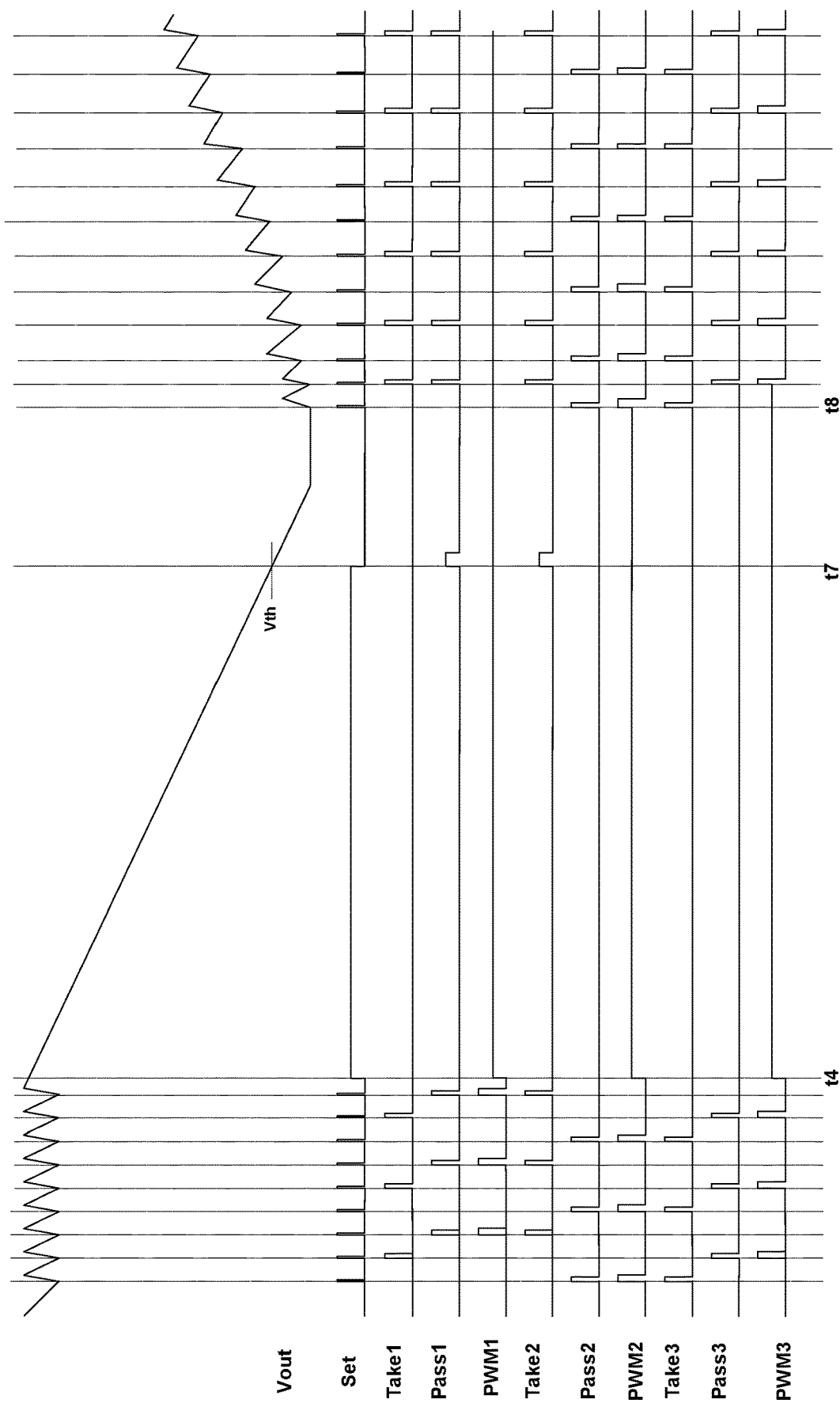

FIG. 8B shows working waveforms of a three-phase switching converter in a fault protection mode in accordance with another embodiment of the present invention. Different from the embodiment shown in FIG. 8A, the control IC 231 in FIG. 8B does not immediately change into a slave control IC to generate the second pulse on the phase output signal Pass1 after the fault condition is detected. As shown in FIG. 8B, the control IC 231 detects a fault condition at t4, and then adjusts the phase control signal Set to keep it at a predetermined level (for example, an intermediate level) for a long time period. During this time period, the switch control signals PWM1~PWM3 all become a high-impedance state, the corresponding transistors are turned off, and the output voltage Vout continues decreasing. When the output voltage Vout drops to a predetermined threshold Vth (for example, 0V) at t7, the control IC 231 generates a second pulse on its phase output signal Pass1, and changes into a slave control IC to stop providing the phase control signal Set.

The control IC 232 detects a second pulse on its phase input signal Take2, and does not detect a fault condition in itself. So the control IC 232 changes into a master control IC, and start to provide the phase control signal Set from t8.

Although switching circuits are all configured in synchronous BUCK in the foregoing embodiments, it can be understood by those skilled in the art that, the switching circuit can also adopt other topologies, such as asynchronous BUCK, BOOST, BUCK-BOOST, etc. The transistors contained therein could also use other suitable controllable semiconductor transistors, besides MOSFET. These transistors can be discrete devices, or integrated together with the corresponding control circuit and driver circuit. In some applications, inductors and capacitors in switching circuits can also be integrated. Moreover, the switch control circuit can adopt control methods other than the constant on time control. These modifications are easy to be understood by people of ordinary skills in the art, thus do not depart from the scope of the present invention.

Figure 9:
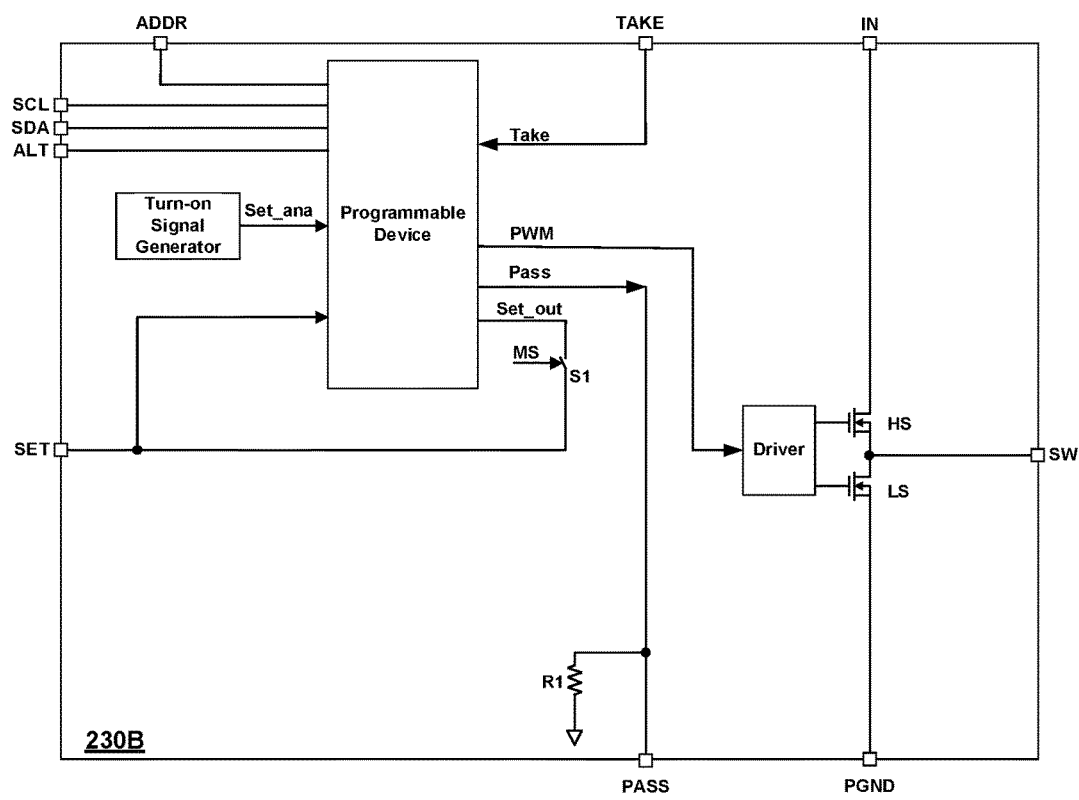
FIG. 9 is a schematic block diagram of a control IC 230B used in a multiphase switching converter in accordance with an embodiment of the present invention.

Moreover, for ease of description, the control circuit in the aforementioned embodiments is divided and illustrated in functional blocks, but this is not used to limit the invention. Some of the blocks in the control circuit may be implemented by discrete devices or ICs, while some blocks may be partially combined and realized by digital signal processing circuits or programmable devices (e.g. PLA, PAL, GAL, EPLD, CPLD, FPGA, etc.). FIG. 9 is a schematic block diagram of a control IC 230B used in a multiphase switching converter in accordance with an embodiment of the present invention. Compared with the embodiment of FIG. 4, the programmable device in FIG. 9 realizes functions of the master slave determination circuit, the signal modulator, the switch control circuit and the fault protection circuit.

A high impedance state refers to an output state of a digital circuit, which is neither logical high nor logical low. If this high impedance state is provided to a downstream circuit, its voltage level will be wholly determined by the downstream circuit, thus might be any of the logical high, logical low and intermediate levels.

In some of the foregoing embodiments, the switch control signal changes to a high impedance state in fault condition. When detecting this high impedance state, the driver circuit turns off transistors in the corresponding switching circuit to stop providing power to the load. People of ordinary skills can recognize that, however, other suitable ways could also be used to disable the corresponding switching circuit. Furthermore, when the switching circuit gets disabled, the transistors in the switching circuit do not have to be turned off simultaneously. For a synchronous BUCK, the high side transistor can be turned off first, and the low side transistor can be turned off later, when a zero cross of inductor current is detected.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A fault protection method used in a multiphase switching converter, wherein the multiphase switching converter includes a plurality of switching circuits coupled in parallel, and a plurality of control circuits configured in a daisy chain and respectively coupled to a corresponding one of the plurality of switching circuits, each of the control circuits has a first terminal, a second terminal and a third terminal, and wherein the first terminals of the plurality of control circuits are coupled together to share a phase control signal, the second terminal of each control circuit is coupled to a previous control circuit in the daisy chain to receive a phase input signal, and the third terminal of each control circuit is coupled to a latter control circuit in the daisy chain to provide a phase output signal, wherein the phase output signal has a first pulse in normal operation, the fault protection method comprises:

configuring a first control circuit as a master control circuit to provide the phase control signal; and respectively configuring each of the rest of the plurality of control circuits as a slave control circuit to receive the phase control signal; wherein if a fault condition is detected in the first control circuit, changing the first control circuit into a slave control circuit and generating a second pulse on the phase output signal of the first control circuit; and wherein if a second pulse is detected on a phase input signal of a second control circuit, changing the second control circuit into a master control circuit.

2. The fault protection method of claim 1, wherein the step of changing the first control circuit into a slave control circuit further comprises: after the second pulse is generated on the phase output signal of the first control circuit, changing the phase output signal of the first control circuit to be substantially identical to the phase input signal of the first control circuit.

3. The fault protection method of claim 1, wherein if a second pulse is detected on the phase input signal of the second control circuit, the second control circuit will be changed into a master control circuit only when there has been no fault condition detected in the second control circuit.

4. The fault protection method of claim 1, further comprising:

if a fault condition is detected in a control circuit configured as a slave control circuit, changing the phase output signal of the control circuit to be substantially identical to the phase input signal of the control circuit.

5. The fault protection method of claim 1, wherein the second pulse has a pulse width or a pulse amplitude different from that of the first pulse.

6. The fault protection method of claim 1, wherein the first pulse has a first pulse amplitude and a first pulse width, the second pulse has a second pulse amplitude and a second pulse width, and wherein a second pulse is detected by the second control circuit when the phase input signal of the second control circuit maintains at the second pulse amplitude for a predetermined time period.

7. The fault protection method of claim 1, wherein the fault condition comprises one or more of: over voltage, over current, over temperature, and transistor failure.

8. The fault protection method of claim 1, wherein the step of changing the first control circuit into a slave control circuit comprises:

adjusting the phase control signal to stop all of the plurality of switching circuits from providing power to the load;

determining whether an output voltage of the multiphase switching converter drops to a predetermined threshold; and when the output voltage of the multiphase switching converter drops to the predetermined threshold, changing the first control circuit into a slave control circuit and generating a second pulse on the phase output signal of the first control circuit.

9. A fault protection method used in a control circuit, wherein the control circuit is adapted to be configured in daisy chain and adapted to be used in a multiphase switching converter includes with a plurality of switching circuits coupled in parallel, the control circuit has a first terminal configured to share a phase control signal, a second terminal configured to receive a phase input signal from a previous control circuit in the daisy chain, and a third terminal configured to provide a phase output signal to a latter control circuit in the daisy chain, wherein the phase output signal has a first pulse in normal operation, the fault protection method comprises:

determining whether the control circuit is configured as a master control circuit or a slave control circuit;

providing the phase control signal at the first terminal of the control circuit if the control circuit is configured as a master control circuit, and receiving the phase control signal at the first terminal of the control circuit if the control circuit is configured as a slave control circuit;

determining whether there exists a fault condition in the control circuit; and if the control circuit is configured as a master control circuit and a fault condition is detected in the control circuit, changing the control circuit into a slave control circuit and generating a second pulse on the phase output signal of the control circuit.

10. A fault protection method of claim 9, further comprising:

if the control circuit is configured as a slave control circuit and a second pulse is detected on the phase input signal of the control circuit, changing the control circuit into a master control circuit.

11. The fault protection method of claim 10, wherein the first pulse has a first pulse amplitude and a first pulse width, the second pulse has a second pulse amplitude and a second pulse width, and wherein a second pulse is detected by the control circuit when the phase input signal of the control circuit maintains at the second pulse amplitude for a predetermined time period.

12. The fault protection method of claim 9, wherein the step of changing the control circuit into a slave control circuit further comprises: after the second pulse is generated on the phase output signal of the control circuit, changing the phase output signal of the control circuit to be substantially identical to the phase input signal of the control circuit.

13. The fault protection method of claim 9, further comprising:

if the control circuit is configured as a slave control circuit and a fault condition is detected in the control circuit, changing the phase output signal of the control circuit to be substantially identical to the phase input signal of the control circuit.

14. The fault protection method of claim 9, wherein the second pulse has a pulse width or a pulse amplitude different from that of the first pulse.

15. The fault protection method of claim 9, wherein the fault condition comprises one or more of: over voltage, over current, over temperature, and transistor failure.

16. The fault protection method of claim 9, wherein the step of changing the control circuit into a slave control circuit comprises:

adjusting the phase control signal to stop all of the plurality of switching circuits from providing power to a load;

determining whether an output voltage of the multiphase switching converter drops to a predetermined threshold; and when the output voltage of the multiphase switching converter drops to the predetermined threshold, changing the control circuit into a slave control circuit and generating a second pulse on the phase output signal of the control circuit.

17. A control circuit adapted to be configured in daisy chain and adapted to be used in a multiphase switching converter with a plurality of switching circuits coupled in parallel, wherein the control circuit comprises:
a first terminal configured to share a phase control signal;
a second terminal configured to receive a phase input signal from a previous control circuit in the daisy chain; and
a third terminal configured to provide a phase output signal to a latter control circuit in the daisy chain, wherein the phase output signal has a first pulse in normal operation; wherein
the control circuit is configured to provide the phase control signal when it is configured as a master control circuit, and is configured to receive the phase control signal when it is configured as a slave control circuit; and wherein
if the control circuit is configured as a master control circuit and a fault condition is detected in the control circuit, the control circuit will change into a slave control circuit and generate a second pulse on the phase output signal of the control circuit.

18. The control circuit of claim 17, wherein if the control circuit is configured as a slave control circuit and a second pulse is detected on the phase input signal of the control circuit, the control circuit will change into a master control circuit.

19. The control circuit of claim 17, wherein if the control circuit is configured as a master control circuit and a fault condition is detected in the control circuit, the control circuit will change its phase output signal to be substantially identical to its phase input signal after the second pulse is generated on the phase output signal.

20. The control circuit of claim 17, wherein if the control circuit is configured as a slave control circuit and a fault condition is detected in the control circuit, the control circuit will change its phase output signal to be substantially identical to its phase input signal.

21. The control circuit of claim 17, wherein the second pulse has a pulse width or a pulse amplitude different from that of the first pulse.

22. The control circuit of claim 18, wherein the first pulse has a first pulse amplitude and a first pulse width, the second pulse has a second pulse amplitude and a second pulse width, and wherein a second pulse is detected by the control circuit when the phase input signal of the control circuit maintains at the second pulse amplitude for a predetermined time period.

23. The control circuit of claim 17, wherein the fault condition comprises one or more of: over voltage, over current, over temperature, and transistor failure.

24. The control circuit of claim 17, wherein if the control circuit is configured as a master control circuit and a fault condition is detected in the control circuit, the control circuit will adjust the phase control signal to stop all of the plurality of switching circuits from providing power to a load, and determine whether an output voltage of the multiphase switching converter drops to a predetermined threshold, and wherein the control circuit will change into a slave control circuit and generate a second pulse on the phase output signal of the control circuit when the output voltage of the multiphase switching converter drops to the predetermined threshold.

25. The control circuit of claim 17, further comprising:
a master control unit configured to generate the phase control signal;
a fault detection configured to detect whether there exists a fault condition in the control circuit, and generate a fault detection signal;
a master slave determination circuit configured to determine whether the control circuit is configured as a master control circuit or a slave control circuit, and generate a master slave determination signal to control the master control unit; and
a switch control circuit coupled to the fault detection circuit and the master slave determination circuit, and configured to generate the phase output signal and a switch control signal for controlling a corresponding one of the plurality of switching circuits, based on the phase control signal, phase input signal, fault detection signal and master slave determination signal.

* * * * *